VARIABLE DELAY SYSTEM FOR DATA TRANSFER OPERATIONS

Filed Dec. 30, 1966 6 Sheets-Sheet 1

INVENTOR.
THEODORE M. HERTZ
BY Robert G. Rogers
ATTORNEY

March 10, 1970 T. M. HERTZ 3,500,330

VARIABLE DELAY SYSTEM FOR DATA TRANSFER OPERATIONS

Filed Dec. 30, 1966 6 Sheets-Sheet 2

INVENTOR.
THEODORE M. HERTZ

BY Robert G. Rogers

ATTORNEY

VARIABLE DELAY SYSTEM FOR DATA TRANSFER OPERATIONS

Filed Dec. 30, 1966 6 Sheets-Sheet 3

*INVENTOR.*
THEODORE M. HERTZ
BY Robert G Rogers
ATTORNEY

March 10, 1970 T. M. HERTZ 3,500,330

VARIABLE DELAY SYSTEM FOR DATA TRANSFER OPERATIONS

Filed Dec. 30, 1966 6 Sheets-Sheet 4

INVENTOR.
THEODORE M. HERTZ
BY Robert G. Rogers
ATTORNEY

INVENTOR.
THEODORE M. HERTZ
BY Robert G. Rogers
ATTORNEY

March 10, 1970 T. M. HERTZ 3,500,330

VARIABLE DELAY SYSTEM FOR DATA TRANSFER OPERATIONS

Filed Dec. 30, 1966 6 Sheets-Sheet 6

INVENTOR.
THEODORE M. HERTZ

BY Robert G. Rogers

ATTORNEY

United States Patent Office 3,500,330
Patented Mar. 10, 1970

3,500,330

VARIABLE DELAY SYSTEM FOR DATA TRANSFER OPERATIONS

Theodore M. Hertz, Whittier, Calif., assignor to North American Rockwell Corporation, a corporation of Delaware Filed Dec. 30, 1966, Ser. No. 606,344
Int. Cl. G06f *1/00, 7/00, 15/00;* G11b *13/00*
U.S. Cl. 340—172.5 4 Claims

ABSTRACT OF THE DISCLOSURE

A storage device having a plurality of logically spaced and interconnectable transducers disposed about a storage medium for delaying the transfer of data between non-random access storage devices, including logic for determining the transducer interconnections for achieving the required delay.

BACKGROUND OF THE INVENTION

Field of the invention

The invention relates to a variable delay system for transferring data between non-random access devices using a non-random access intermediate storage device.

Description of prior art

Delay systems have been embodied in various configurations for different purposes, for example, Robbins' Patent No. 2,674,733 describes delay circuits having a capability for sorting randomly recorded information into an evenly spaced sequence. The delay system is initially set at a maximum delay value under control of a delay control circuit producing the control electrical signals and then is controlled to decrease the delay by a predetermined amount each time a space between the randomly spaced sets of signals is detected. In another patent to Robbins, No. 2,674,732, a sorting and extracting system utilizes a plurality of delay sections having delays specified in accordance with a geometric progression which are interconnected by electrical gating circuits. The gating circuits are controlled by binary coded electrical signals representing the desired delay.

Ordinarily, a data transfer system using non-random access storage devices requires transferring data from a storage location in one portion of the system to a different storage location in another portion of the system. In other situations, the interchange of data may be required between one or more data processing systems. However, in either situation, and in other cases where data must be taken from a memory location and transferred after a delay to a different memory location, controls must be included.

Without controls the data could be erroneously written into an incorrect memory location or it could be destroyed because the correct location was not available to receive the data. In certain access systems such as core memories, the difficulty is not present. Addressing means are available for reading from one location to another location without delays usually encountered in a non-random access system such as a disc or drum or delay line memory. In the latter system, time must be lost until the selected location in the memory rotation cycle appears under the writing device which is actuated to place data in that location.

Desirably, means are interposed between the location from which the data is read and the location into which the data is to be written to store the read data until the proper location is available. The storage should include delay means which can be varied between the smallest delay and largest delay possible with the particular system used.

Because of inherent limitations in the location of read and write heads in a non-random access system, the variable delay means should include a means for compensating for the inherent delays resulting from read-write head locations.

The present invention overcomes the problems associated with data transfers between non-random access systems and provides a system which includes the desirable features indicated above.

SUMMARY OF THE INVENTION

Briefly, the invention comprises means for determining the difference between the location from which data is transferred and the location which is selected to receive the data and for determining electronic delays which may be incurred in transferring the data. The means for determining electronic delays may be omitted if the transducers can be properly positioned to eliminate the electronic delays.

Further, the invention comprises means for storing data received from the first storage medium in an intermediate storage medium under the control of the delay determining means. The data is stored in the intermediate storage device until the address in the second storage medium selected to receive the data is available. Subsequently, and under the control of the delay determining means, the data is written into the proper location in the receiving storage device.

Therefore, it is an object of this invention to provide a variable delay system for data transferred between locations in non-random access memory devices.

It is another object of this invention to provide an improved system for controlling the transfer of data between non-random access storage devices.

It is a further object of this invention to provide means for determining the time delay to be incurred in transferring data between non-random access storage devices and for storing the data to be transferred for the determined delay.

BRIEF DESCRIPTION OF THE DRAWINGS

These and other objects of this invention will become more apparent in connection with the following drawings of which.

FIGURE *5a* represents logic matrix for determining read/write head interconnection about the delay track.

FIGURE *5b* represents the interconnection of read/write heads with the logic matrix shown in FIGURE *5a*.

DESCRIPTION OF THE PREFERRED EMBODIMENTS

Figure 1:
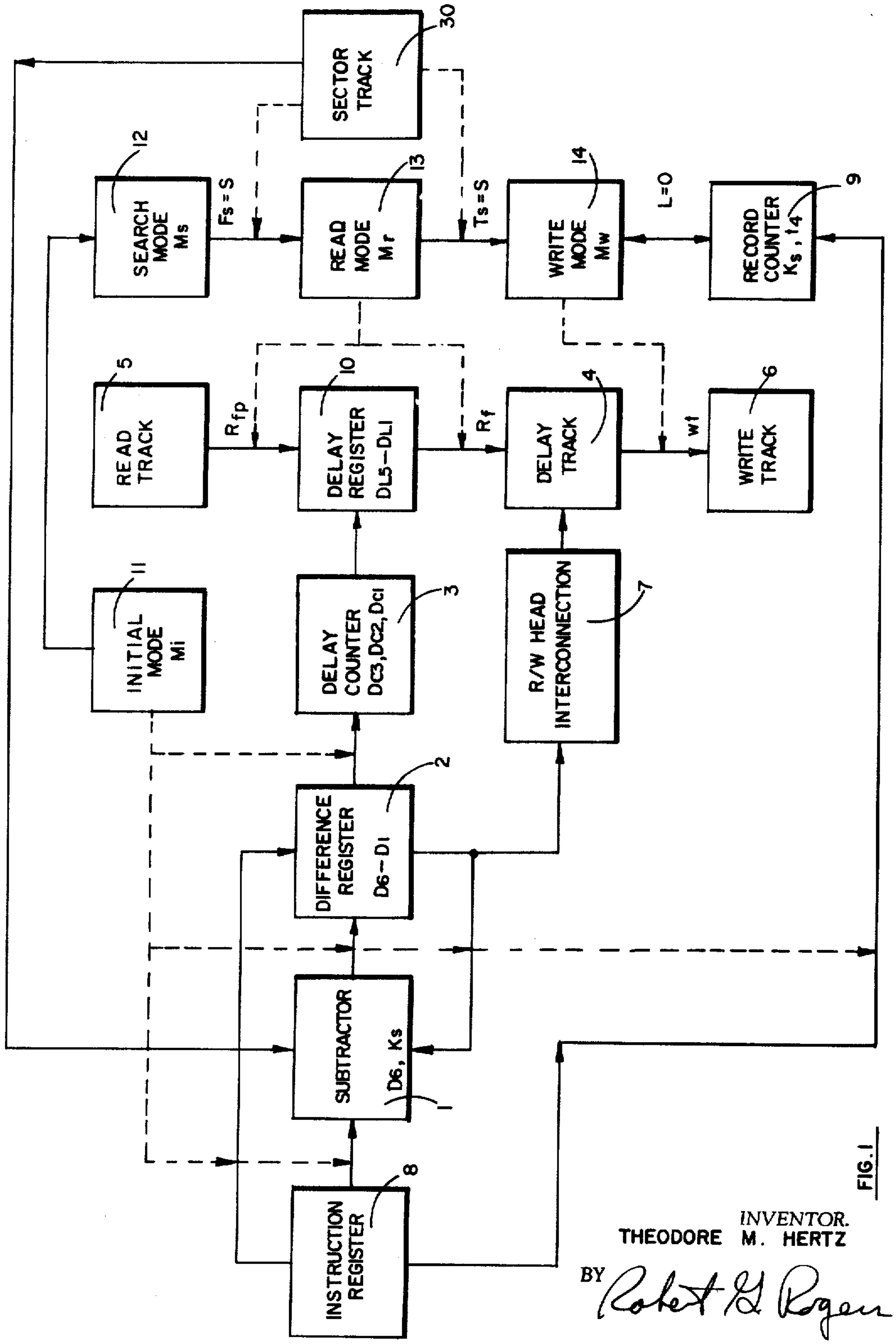
FIGURE 1 represents an embodiment of a system for transferring data between non-random access memory devices.

FIGURE 1 shows subtractor means 1 for determining the difference between the location from which data is to be read, $F_s$, and the location into which the data is to be written, $T_s$.

Difference register 2, connected to subtractor 1, records the calculated difference. Simultaneously, electronic delay counter 3, connected to the difference register, records the delay necessary to compensate for the electronic delays which will be incurred during a transfer. The difference between locations and the recorded delay provides logic control signals for regulating the transfer of data between an address in read track 5 of a non-random access system (not shown) and an address on write track 6 of another non-random access system (not shown).

Although disc memories are illustrated herein as a type of non-random access device, other storage devices such as drum memories and other rotating memories on which a recording surface has been formed, and delay lines, are within the scope of this invention.

Interconnection logic 7 is connected between register 2 and delay track 4 for interconnecting read-write heads of the system in accordance with the difference contained in register 2.

Instruction register 8 is connected to the subtractor, the difference register, and to record counter 9.

Delay register 10 is connected between the read head $R_{fp}$ of read track 5 and write head $W_7$ (see FIGURE 3) of the delay track 4. Information, $R_f$, is gated from track 5 into track 4 through register 10 under the control of delay counter 3. Delay counter 3 provides signals to logic for compensating for the electronic delays. Other embodiments of the control could be achieved between the delay track and the write track.

The transfer operation may be described as a sequence of modes. The mode connections which control the transfer operations are shown by the dotted lines in FIGURE 1. Initial mode logic 11 provides signals to control the instruction register, subtractor, difference register, delay counter and the record counter. The record counter terminates the transfer operation when all the data has been transferred.

Search mode logic 12 is connected to the initial mode logic and becomes actuated at the termination of the initial mode. The search logic determines when the data is to be transferred from track 5.

Read mode logic 13 connected to logic 12, provides signals to control the reading of information from track 5 into track 4. Write mode logic 14 connected between read mode logic 13 and the record counter, controls reading of the information from the delay track into the write track. Inasmuch as there are four modes, the mode control signal could be produced with two switching devices such as flip flops having two logical states.

Sector track 30 is shown as being connected to subtractor 1. It provides sector identification signals for comparing the sector track address with the read track address ($F_s$) during the search mode and for comparing the sector track address with the write track address ($T_s$) during the read mode. A portion of the subtractor is used for sector identification in the particular embodiment illustrated. In other embodiments, it may be more practical to use another portion of the system for sector identification or provide a separate identification means. For the particular system described, it is assumed that the sector track is synchronized with the read and write tracks. Synchronization would be possible in the case where the read, write and sector tracks were rotated by a common shaft. In other systems, electronic or mechanical means would have to be provided to synchronize the sector track within the read and write track. Also, it may be more feasible in certain applications to use a substitute for the sector track and sector identification. Suitable substitutes are believed to be well known to those skilled in the art.

Figure 2:
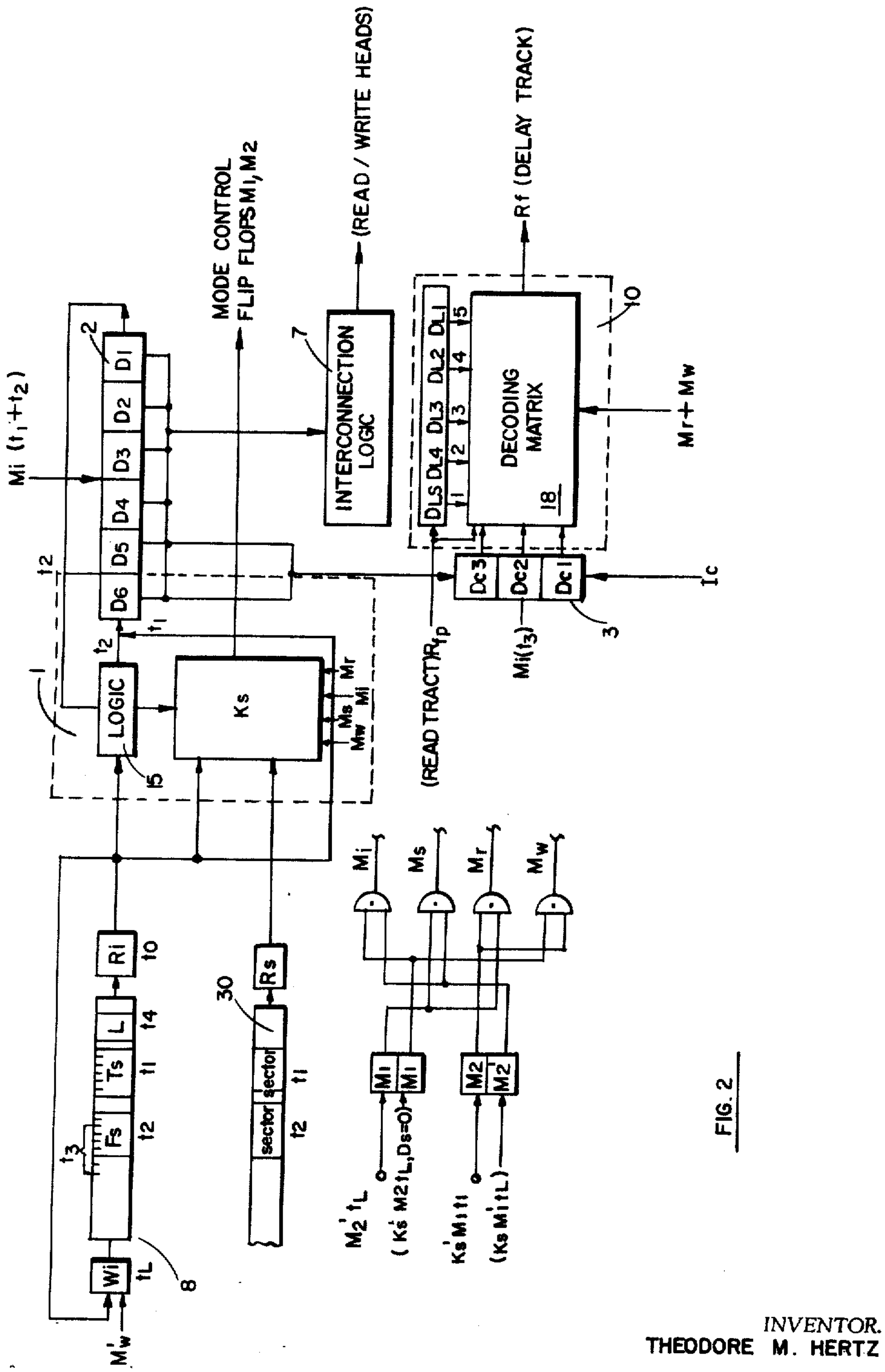
FIGURE 2 represents an embodiment of logical circuitry for determining delay and controlling transfer of data.

Portions of the FIGURE 2 circuitry are designated in the FIGURE 1 system, within the functional blocks comprising the system, so that the functional system representation can be more easily related to the specific structure of FIGURE 2. For example, flip flops $D_6$ and $K_s$ designated in the subtractor block are illustrated more specifically in FIGURE 2.

FIGURE 2 shows a specific illustrative embodiment of part of the control electronics generalized in FIGURE 1. Specifically, instruction register 1, connected to the subtractor and the difference register, is shown as comprising a one word recirculating register including write head $W_1$ and read head $R_1$. The register temporarily stores information bits representing the track address $F_s$ from which data is to be extracted and information bits representing the track address $T_s$ into which the data is to be written. For the system embodiment described, the addresses are represented by six (6) binary digits of computer information.

Binary coded information, L, in one portion of the register, indicates the number of words to be moved or transferred. Other operational parameters may also be included in the recirculating register.

Subtractor 1 comprises logic 15, including the $K_s$ borrow flip flop and the D6 flip flop of the difference register. The add-subtract logic subtracts the address $F_s$ of the read track from the address $T_s$ of the write track. The difference is inserted into register 2 as a series of logical ones or zeros. Register 2 comprises a shift register in which information is shifted through flip flops $D_6$–$D_1$. Each flip flop, denoted by its subscript, corresponds to an interval of delay, in other words, if the $D_2$ flip flop contained a binary zero, it would indicate that the delay interval equivalent to $D_2$ would be omitted. Interconnection logic 7 is connected to register 2 and provides the gating necessary to set the delay in track 4.

Sector read flip flop, $R_s$, is connected to the $K_s$ flip flop and provides address information from sector track 30 for comparison with instruction register sector addresses $F_s$ and $T_s$ during the search mode and read mode. When there is agreement, the $K_s$ flip flop provides a sector identification signal which switches from search mode to read mode, to permit the information from the read track to be gated to the delay track. Subsequently, $T_s$ information is compared with corresponding sector addresses in the sector track 30. When agreement is reached, the $K_s$ flip flop provides a mode switching signal for gating the information from the delay track into the write. The switching signals are used to switch mode control flip flops $M_1$ and $M_2$. The $M_s$ mode control signal is generated by the $M_s$ "and" gate which provides an input signal to the $K_s$ comparison flip flop during $t_1$ time. Similarly, an $M_w$ mode control signal is generated by $M_w$ "and" gate to the comparison flip flop during $t_2$ time.

Initial mode control gate, $M_I$, regulates the timing of the difference register during $t_{1,2}$ time. The signal is generated by $M_I$ "and" gates.

Information from read head $R_{fp}$ is gated through the decoding matrix of the delay register under the control of the delay counter.

Delay counter 3 is connected to the difference register and counts a binary one for each pair of ones appearing in flip flops $D_6$ and $D_5$ of the difference register. Flip flops $D_{c3}$, $D_{c2}$, and $D_{c1}$ comprise a binary delay counter. An $I_c$ signal is provided for clearing the delay counter before a transfer operation begins.

As previously indicated, the spacing between the read-write heads of a non-random access system may be slightly less than the number of bit positions between the read-write heads because of inherent electronic delays. As a result, heads properly positioned for a selected interconnection would probably be incorrect for a different interconnection. It is therefore necessary to consider a head to be positioned at least one bit closer to the previous head, opposite to the direction of track rotation, than the power of 2 spacing would indicate. The unit of delay may be more than one bit but it would be the same for each interval between heads. The delays would not be an important consideration if reading from a selected head followed the writing. However, if any heads exist between the read and write operations, the segment or portion of the track between the read and write heads would, in effect, be shortened by the number of positions equal to the number of skipped, or interconnected heads. The skipped heads correspond to the pairs of adjacent binary ones in the difference register. The pairs of ones are counted by the delay counter, which provides a delay corresponding to the total number of adjacent ones.

Delay counter 3 is connected to delay register 10 through decoding matrix 18. Delay register 10 may be a shift register. Information from the read track is picked up by read head $R_{fp}$ and shifted into the decoding matrix through flip flops $D_{L5}$ and $D_{L4}$ comprising the delay register. The information may go directly into the decoding matrix from $R_{fp}$ if no delay is required. Mode control "and" gate $M_r$ regulates reading the information from read track into the delay track during $t_4$ time.

The delay counter provides control signals so that the information is gated through the decoding matrix after a proper delay has been incurred. As previously indicated, the delay could be incurred between the read and delay tracks or between the delay and write tracks.

Figure 3:
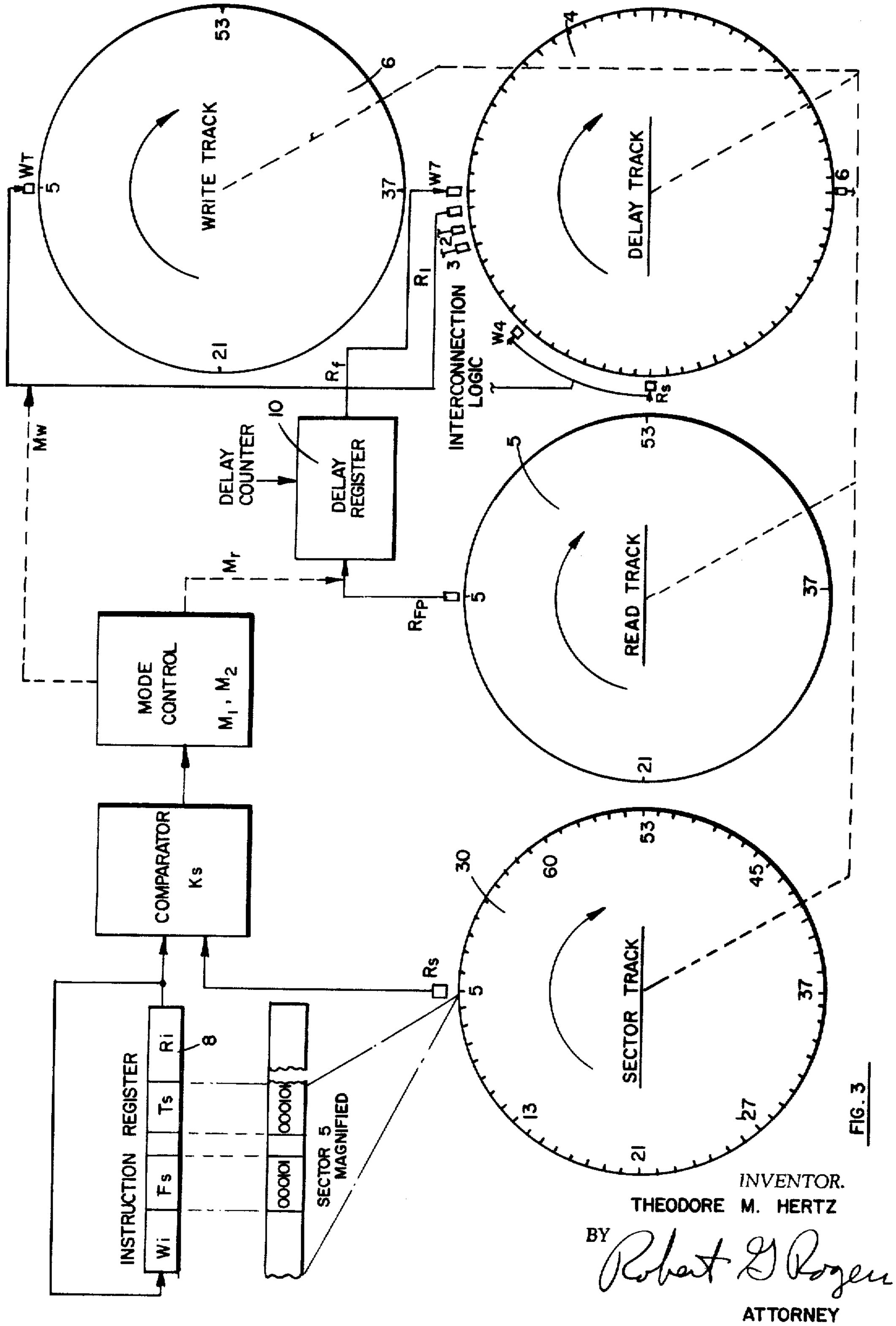
FIGURE 3 represents an embodiment of means for determining delays to be incurred in transferring data between non-random access memory devices.

FIGURE 3 shows read track 5 and read head $R_{fp}$ for detecting information sorted on the read track. The read head is connected to the delay register so that information passing from the read track can be properly delayed as previously described. The delay register is connected to $W_7$ or a particular one of the read-write heads one through six, positioned about delay track 4. Information coming from the delay register is designated as $R_f$.

Delay track 4 is shown as comprising six delay sections. The space between read head 1 and read-write head 2 comprises one space. The other spaces correspond to the intervals between the read-write heads. The heads are spaced so that the bit positions between them correspond to the power of two (2) geometric progression. For example, space between $R_1$ and $R_2/W_2$ is one, or two raised to the zero power. Although six delay sections are shown corresponding to flip flops $D_1$ through $D_6$, it is possible to provide more or less delay sections by adding additional heads, or by making the delay track larger. Also, the track can be made smaller and the number of heads reduced.

It should be understood, however, that the number of delay sections corresponds to the number of flip flops comprising the difference register, and the number of flip flops comprising the delay register. The number six was selected because the addresses involved for the described system embodiment are represented by six binary bits.

Write head $W_t$ is connected to either read head 1 or a selected one of the read-write heads associated with the delay track. Write head $W_t$ writes information at a selected location about write track 6.

The information being transferred is in digital form which is expressed as either a binary 1 or binary 0. The binary 1 is recorded on the magnetic material comprising the track surface by magnetizing the material in either one of two directions. The recorded information is read by sensing the magnetic orientation as the magnetic surface is passed under a read head.

In other words, if the information were written in by $W_7$ and read out by $R_1$, the maximum delay would be achieved. A minimum delay would occur if the information were written directly into track 6 by $W_t$.

Sector track 30 is shown as interconnected, such as by a common shaft, to the read and write tracks, so that the addresses of each track are synchronized. The common shaft is also shown as connecting the read and write tracks with the delay track so that rotation of the tracks is synchronized. The interconnection is shown by the dash lines.

Sector 5 is shown being read by flip flop $R_s$. The sector addresses are compared by the $K_s$ flip flop during the $M_s$ mode. For example, if sector 5 is equal to the address, $F_s$, during $t_2$ time and during the $M_s$ mode, the comparison flip flop generates a signal to switch the mode control flip flop, $M_2$ for changing the mode. Similarly, a comparison is made during $t_1$ time of the read mode to regulate transfer of information from the delay track into the write track.

Mode control signals from $M_1$ and $M_2$ regulate reading from the read track into the delay track and from the delay track into the write track. The dash lines show the regulations of the reading from $R_{fp}$ and writing by $W_t$.

In order to describe the operation of the system, assume that data is to be transferred from sector 5 of $F_s$ of read track 5 into a sector 60, $T_s$, and write track 6. In other words, information is read from sector 5 and delayed for 55 sector times until sector 60 appears in position under write head $W_t$. During the initial mode, $M_1$, the sector location $F_s$ is subtracted from sector location $T_s$. Sector 60 is placed in difference register during $t_1$ time. During $t_2$ time sector 5 is subtracted. The least significant bit of sector 60 appears in $D_1$ at the beginning of $t_2$ time. The least significant bit of sector 5 appearing in $R_1$ during $t_2$ time is subtracted from it. If the bits are alike, a zero is written into $D_6$ as the least significant bit of the difference. If they are not alike, a one is written. If a borrow is indicated, the $K_s$ flip flop is set. The operation continues until the subtraction is complete and the binary difference, 110111, or 55 in decimal, appears in the difference register. Since $D_4$ flip flop is zero, logic 7 provides signals to connect $W/R_5$ and $W/R_4$ to omit the corresponding delay $D_4$ indicated in the delay track.

Since the binary number comprises three pairs of adjacent ones, the flip flops comprising the delay counter are set to a binary three. $D_{c1}$ and $D_{c2}$ are set to a binary one. $D_{c3}$ is set to a binary zero. The read-write interconnection logic interconnects read-write head 5 with read-write head 4 so that sector $D_4$ is skipped or cut out. Since a maximum of 63 sectors of delay is possible, the 8 sectors of $D_4$ must be omitted to achieve the desired delay of 55. Information would be read beginning at sector 5 on read track 5, transferred through the delay register in order to take into account the electronic delays, and would be read into $W_7$ of the delay track. The information then rotates clockwise around the delay track, is read by read-write head 5 and written back onto the delay track by read-write head 4. Subsequently, it is read from the delay track by read head, $R_1$, and transferred to the write head $W_t$ at sector 60 of write track 6. Since 3 pairs of ones appeared in the binary difference, that would indicate that the information being read by $R_{fp}$ would have to be delayed an additional three bits in going through the delay register so that the actual calculated delay of 55 could be achieved.

If 32 sectors of delay had been calculated, logic 17 would interconnect read-write head 6 with write head $W_t$. In that case, there would be no reason for interconnecting the read-write head, R/W with read head $R_1$. Also, if a delay of 48 sectors had been calculated, read-write head 5 would be directly connected to $W_t$. If two sectors of the delay had been indicated by the difference register, information $R_f$ coming from the delay register would be connected directly to read-write head 3 and read-write head 2 would then be connected directly to $W_t$.

Figure 5A:
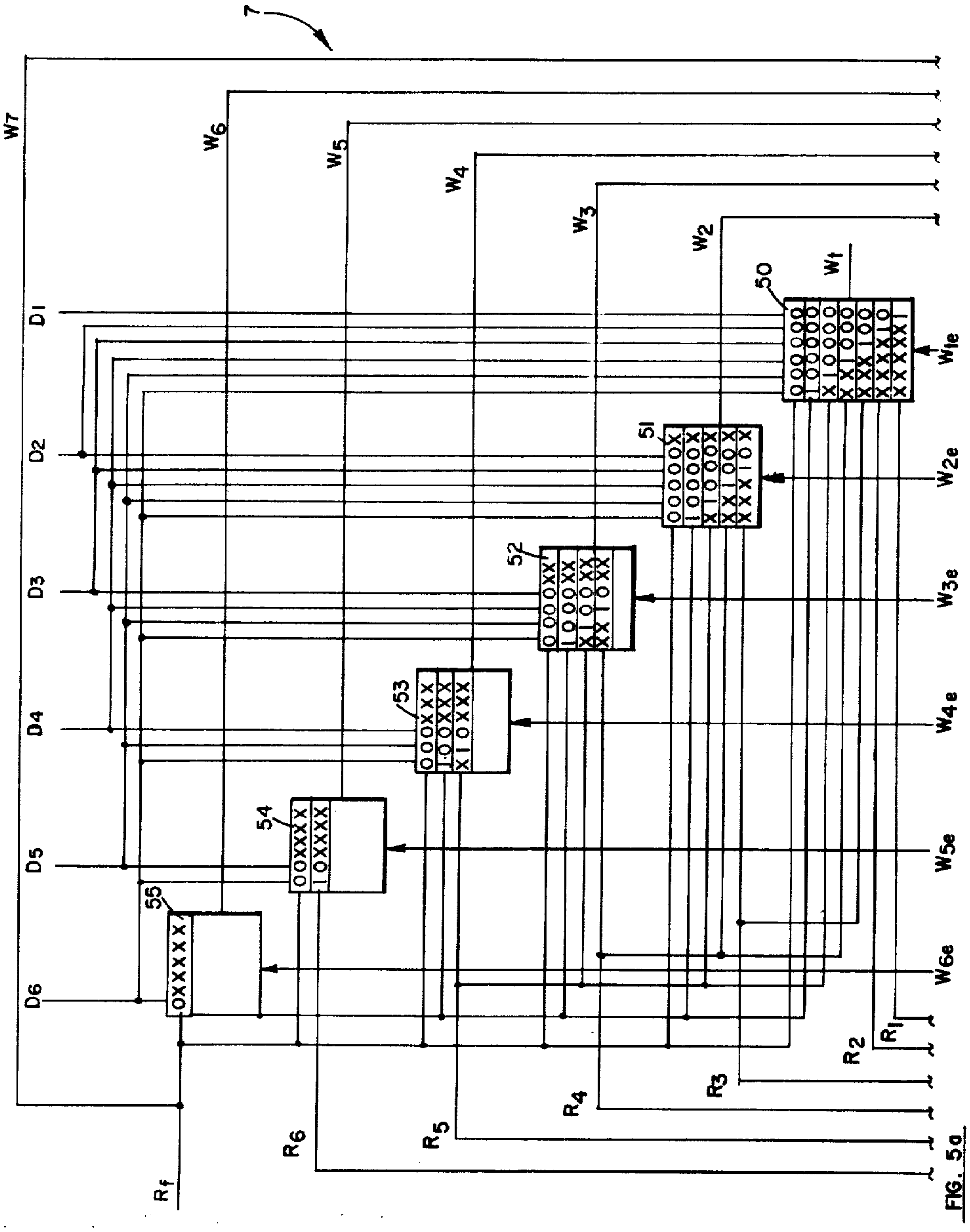
Figure 5B:
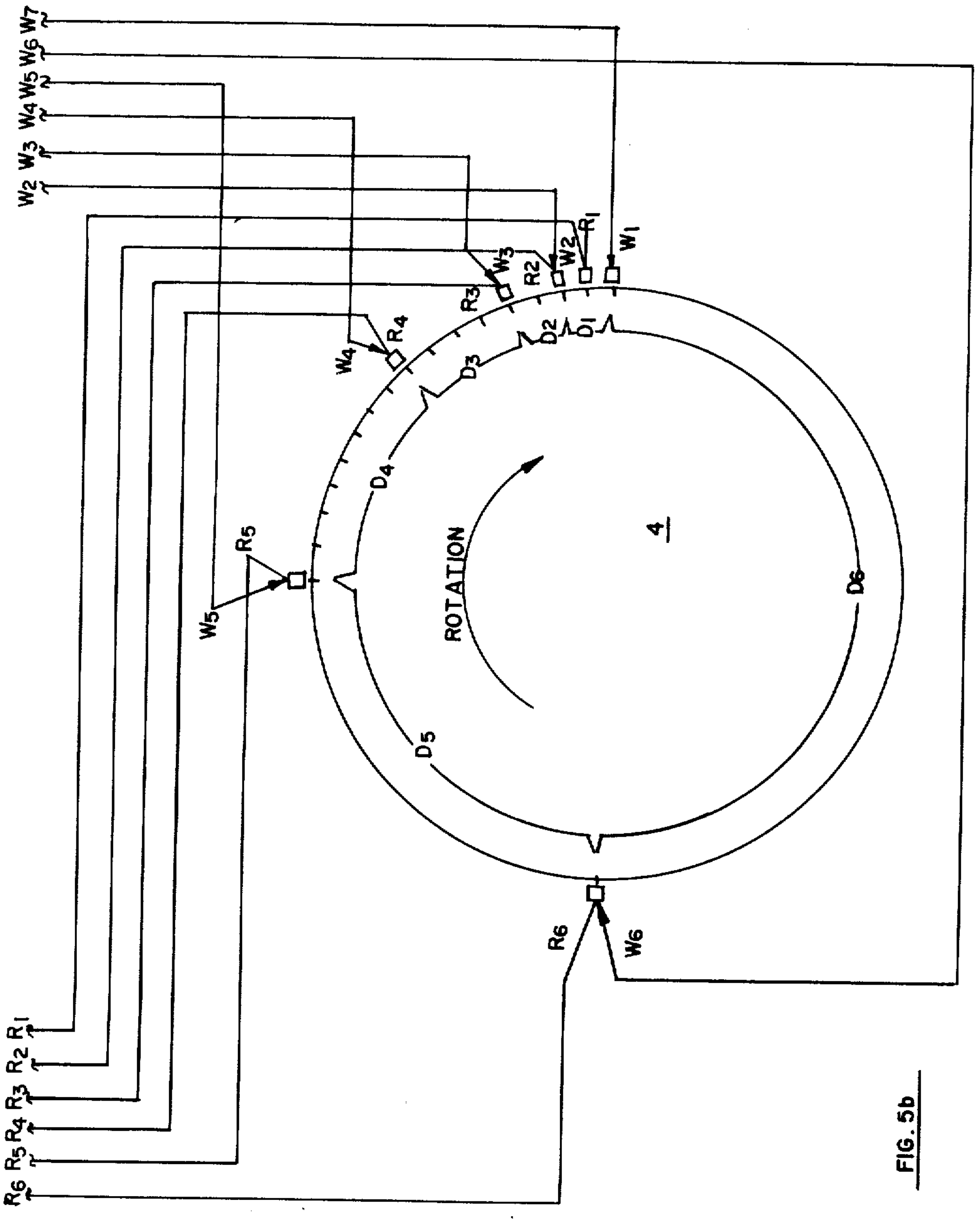

A more specific illustration of read-write head interconnection logic 7 is seen in FIGURES 5*a* and 5*b*. The read head portion of R/W heads 2–6 and $R_f$ are connected to selected write head portions of the read-write heads or to $W_t$ depending on the difference in register 2.

Logic matrices 50 through 55 (FIGURE 5*a*) interconnect the read-write heads with $R_f$ and $W_t$. For example, $R_f$ is connected directly to $W_t$ of the write track if $D_6$ through $D_1$ are set to binary zeros as shown in matrix 50. Information from $R_6$ is connected to $W_2$ if $D_6$ and $D_1$ are set to binary one and $D_5$ through $D_2$ are set to binary zeros as shown in matrix 51. Since information from matrix 51 is only gated into $W_2$, the line from $D_1$ of the difference register may be eliminated. The *x* of the symbolic logic inside the matrix boxes indicates that a line may be eliminated as unnecessary.

In matrix 52 (FIGURE 5*a*), information $R_f$ is gated into $W_3$ if $D_6$ through $D_3$ are set to binary zero and $D_2$ and $D_1$ are set to binary ones. Since the information is always written into $W_3$ from matrix 52, it is not necessary to include conductor lines from $D_2$ and $D_1$.

The same generalization also applies to matrices 53 through 55. Information is always written into $W_7$ regardless of the logic. Information written in at $W_7$ would be written over by the next write head which was actuated by logic 7.

Inputs to the logic matrix are arranged in an order corresponding to the possible inputs to the read-write heads around the delay track going in a clockwise direction as shown in FIGURE 5*b*. $W_6$ can only have input from $R_f$ because no other read heads separate that head from $R_f$. $W_5$ is separated from $R_f$ by $R_6$ and therefore an input from $R_6$ must be included. Similarly, since $W_t$ can have an input from any one of the read-write heads and from $R_f$, matrix 50 must include inputs from each read-write head and from $R_f$.

If information is written into $W_3$ from $R_4$, there is no need for electrical connections from $D_6$ and $D_5$ to matrix 52 because the information would either have been delayed through those corresponding delay sections or it would have by-passed those delay sections completely before being read by $R_4$.

The matrix also includes write enable inputs $W_{6e}$ through $W_{te}$. The signals are shown although in effect they correspond to the primes of the last difference register bit position input to the matrix as shown in logic described herein.

Figure 4:
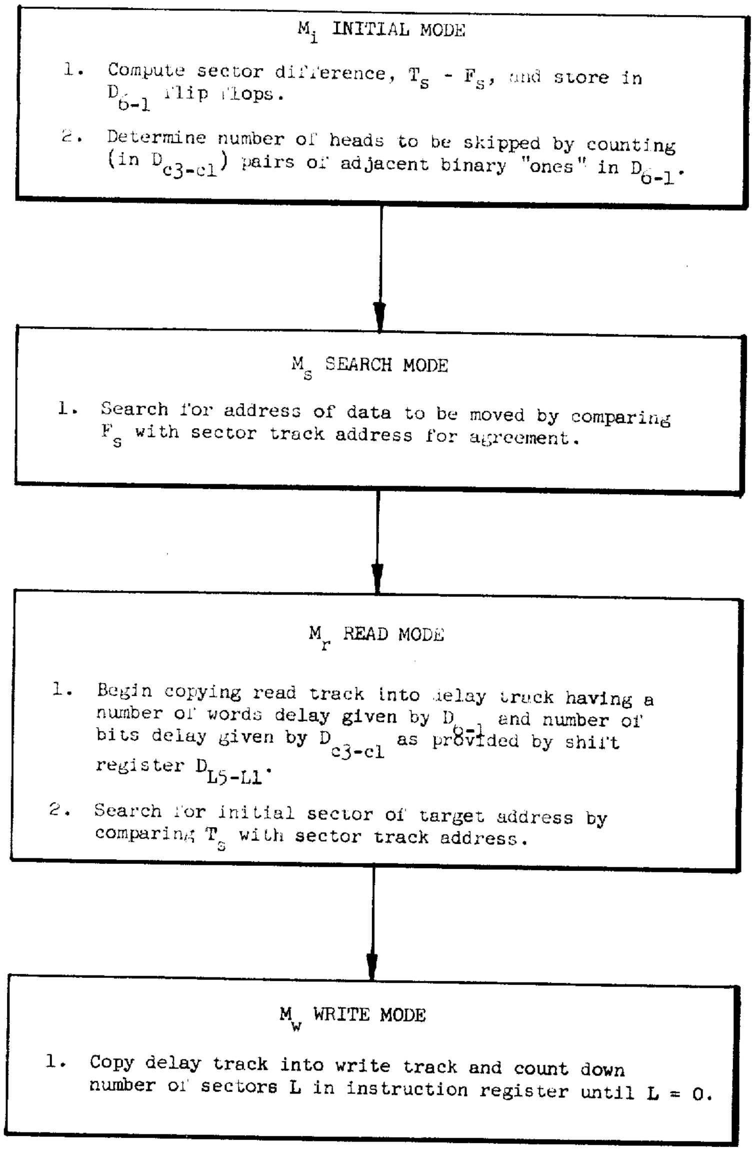
FIGURE 4 is a block diagram representation of the various modes comprising system operation.

A more general description of the operation of the system may be seen by referring to the FIGURE 4 mode diagram and the logic of the system for executing each mode.

The mode control diagram is described more fully in connection with FIGURE 4 wherein is shown the four modes comprising system operation.

During the initial mode identified by gate $M_1$, $$M_1=M_1'M_2'$$

the sector difference, $D_s$, is determined in addition to computing the delays incurred due to interconnection of heads.

Sector bits $T_s$ are copied into the difference register at $t_1$ time by flip flop $R_1$, as shown by the following logic:

$$1^{d}6=R_1M_1t_1$$
$$0^{d}6=R_1'M_1't_1$$
$$1^{d}j=D_{j+1}M_1t_1$$
$$0^{d}j=D_{j+1}'M_1t_1,\ j=5, 4, 3, 2, 1$$

Sector bits, $F_s$, are subtracted from the $T_s$ bits during $t_2$ time and the difference is written into the difference register by means of the following logic:

$$1^{d}6=(D_1R_1K_s=D_1R_1'K_s'+D_1'R_1K_s'+D_1'R_1'K_s)M_1t_2$$
$$0^{d}6=(D_1'R_1'K_s'+D_1'R_1K_s+D_1R_1K_s'+D_1R_1'K_s)M_1t_2$$
$$1^{d}j=D_{j+1}M_1t_2$$
$$0^{d}j=D_{j+1}'M_1t_2,\ j=5, 4, 3, 2, 1$$

It should be understood that the exact logical interconnections between various flip flops and gates comprising the system as illustrated in FIGURES 1 and 2 are not shown. However, such interconnections are believed well known to such persons skilled in the art and for that reason, full interconnections are not shown.

Borrow logic for the subtractor during the initial mode is, $$1^{k}s=D_1'R_1M_1t_2$$
$$0^{k}s-D_1R_1'M_1t_2$$

While the difference between the two locations, $D_s$, is being inserted into the D register, the number of adjacent binary ones are counted to determine the number of delays which will be incurred as a result of read-write head interconnections about track 5. The count is recorded in the delay counter during $t_3$ time, by means of the following equations.

$$1^{d}c3=D_{c3}'D_{c2}D_{c1}(D_6D_5M_1t_3),\ 0^{d}c3=I_c$$
$$0^{d}c2=D_{c2}'D_{c1}(D_6D_5M_1t_3)$$
$$0^{d}c2=D_{c2}D_{c1}(D_6D_5M_1t_3)+I_c$$
$$1^{d}c1=D_{c1}'(D_6D_5M_1t_3)$$
$$0^{d}c1=D_{c1}(D_6D_5M_1t_3)+I_c$$

The $I_c$ signal clears the delay counter to zero initially. Time interval, $t_3$, covers the period the binary difference pairs could appear in the $D_6$, $D_5$ flip flops. As a result, $t_3$ time begins two bit times after $t_2$ time becomes true and turns off one bit time after $t_2$ time goes false. Signals may be generated for $t_1$ through $t_3$ by flip flops or other means well known to those skilled in the art.

The contents of the instruction register are recirculated and therefore preserved by means of the following logic, $$1^{w}i=R_iM_w'$$
$$0^{w}i=R_i'M_w'$$
$$M_w'=(M_1'M_2)'=M_1+M_2'$$

which includes $M_1$

The initial mode, $M_1$, is terminated after one sector time by, $$1^{k}s=(R_iR_s'+R_i'R_s)M_st_2$$

where $t_L$ is the last bit time of the first sector of the system operation.

Following the initial mode, search mode gate, $M_s$, is turned on.

$$M_s=M_1M_2'$$

During the $M_s$ mode, as shown in FIGURE 2, the sector bits $F_s$ in the instruction register are compared through flip flop $K_s$ with the recorded sector bits of track 30. The $K_s$ flip flop is turned on so long as no agreement is reached.

$$1^{k}s=(R_iR_s'+R_i'R_s)M_st_2$$

Where $K_s$ is false at $t_L$ time of the search mode, sector agreement has been reached and the $M_s$ mode is terminated by, $$1^{m}2=K_s'M_1t_L$$

Subsequently, read mode $M_r$ begins. Read mode logic may be represented as, $$M_r=M_1M_2$$

During $M_r$, data from read track is copied into the delay track in a manner which provides the necessary delay represented by the sector difference $D_s$ appearing in flip flops $D_{6-1}$ and bit delays corresponding to the contents of the $D_{c3-c1}$ flip flops. The information read from the read track appears at $R_{fp}$ and is passed through the five bit shift register $D_{L5-L1}$.

$$1^{d}L5=R_{fp}$$
$$0^{d}L5=R_{fp}'$$
$$1^{d}Lj=D_{L(j+1)}$$
$$0^{d}Lj=D_L'(j+1),\ j=4, 3, 2, 1$$

Information read from $D_{L5}$ is delayed one bit time relative to that read from $R_{fp}$; information read from $D_{L4}$ is delayed two bit times, and so on. Possible zero through five bit time delays are covered by the following logic generalized in FIGURE 2 or decoding matrix 18, $$1^{r}f=R_{fp}D_{c3}'D_{c2}'D_{c1}'+LD_{L5}D_{c3}'D_{c2}'D_{c1}+D_{L4}D_{c2}D_{c1}'+D_{L3}D_{c2}D_{c1}+D_{L2}D_{c3}D_{c1}'+D_{L1}D_{c3}D_{c1}$$
$$0^{r}f=R_{fp}'D_{c3}'D_{c2}'D_{c1}'+L_{L5}'D_{c3}'D_{c2}'D_{c1}+D_{L4}'D_{c2}D_{c1}'+D_{L3}'D_{c2}D_{c1}+D_{L2}'D_{c3}D_{c1}'+D_{L1}'D_{c3}D_{c1}$$

Data is written from $R_{fp}$ into the delay track by a write head determined by the difference register. A write flip flop from logic 7 illustrated in FIGURE 5, actuates a selected R/W head to generate the bit pattern of ones and zeros for each head. A write enable signal is also provided by logic 7 to enable the flip flop to actuate the R/W head. Logic for the write flip flops and respective enable signals follows:

$$1^{w}7=R_{f} \qquad W_{7e}=1$$
$$0^{w}7=R_{f}'$$
$$1^{w}6=R_{f} \qquad W_{6e}=D_{6}'$$
$$0^{w}6=R_{f}'$$
$$1^{w}5=R_{f}D_{6}'+R_{6}D_{6} \qquad W_{5e}=D_{5}'$$
$$0^{w}5=R_{f}'D_{6}'+R_{6}'D_{6}$$
$$1^{w}4=R_{f}D_{6}'D_{5}'+R_{6}D_{6}D_{5}'+R_{5}D_{5} \qquad W_{4e}=D_{4}'$$
$$0^{w}4=R_{1}'D_{6}'D_{5}'+R_{6}'D_{6}D_{5}'+R_{5}'D_{5}$$
$$1^{w}3=R_{f}D_{6}'D_{5}'D_{4}'+R_{6}D_{6}D_{5}'D_{4}'+R_{5}D_{5}D_{4}'+R_{4}D_{4} \qquad W_{3e}=D_{3}'$$
$$0^{w}3=R_{1}'D_{6}'D_{5}'D_{4}'+R_{6}'D_{6}D_{5}'D_{4}'+R_{5}'D_{5}D_{4}'+R_{4}'D_{4}$$
$$1^{w}2=R_{f}D_{6}'D_{5}'D_{4}'D_{3}'+R_{6}D_{6}D_{5}'D_{4}'D_{4}'+R_{5}D_{5}D_{4}'D_{3}'+R_{4}D_{4}D_{3}'+R_{3}D_{3}$$
$$0^{w}2=R_{f}'D_{6}'D_{5}'D_{4}'D_{3}'+R_{6}'D_{6}D_{5}'D_{4}'D_{3}'+R_{5}'D_{5}D_{4}'D_{3}'+R_{4}'D_{4}D_{3}'+R_{3}'D_{3} \qquad W_{2e}=D_{2}'$$

While the data from the read track is being delayed in the delay track, a search for the address of the destination of the data is made. $K_s$ is used to compare the sector track with the $T_s$ sector bits in the instruction register.

$$1^{k}s=(R_{1}R_{s}'+R_{1}'R_{s})M_{r}t_{1}$$
$$0^{k}s=t_{L}$$

After sector agreement is achieved, $K_s'$ will be false at $t_L$ time, which terminates $M_r$.

$$0^{m}1=K_{s}'M_{2}t_{L}$$

If the sector difference, $D_s$, is zero, mode $M_r$ is skipped because of $$0^{m}1=K_{s}'D_{6}'D_{5}'D_{4}'D_{3}'D_{2}'D_{1}'M_{s}t_{L}$$

In either event, resetting of $M_1$ initiates the write mode $M_w=M_1'M_2$.

During $M_w$, data from the delay track is written into the write track starting at $T_s$ and continuing for as many sector times as indicated by L. Write flip flop $W_t$ and associated write enable signal $W_{te}$ have the following logic:

$$1^{w}t=R_{f}D_{6}'D_{5}'D_{4}'D_{3}'D_{2}'D_{1}'=R_{6}D_{6}D_{5}'D_{4}'D_{3}'D_{2}'D_{1}'+R_{5}D_{5}D_{4}'D_{3}'D_{2}'D_{1}'+R_{4}D_{4}D_{3}'D_{2}'D_{1}'+R_{3}D_{3}D_{2}'D_{1}'+R_{2}D_{2}D_{1}'+R_{1}D_{1}$$
$$0^{w}t=R_{f}'D_{6}'D_{5}'D_{4}'D_{3}'D_{2}'D_{1}'+R_{6}'D_{6}D_{5}'D_{4}'D_{3}'D_{2}'D_{1}'+R_{5}'D_{5}D_{4}'D_{3}'D_{2}'D_{1}'+R_{4}'D_{4}D_{3}'D_{2}'D_{1}'+R_{3}'D_{3}D_{2}'D_{1}'+R_{2}'D_{2}D_{1}'+R_{1}'D_{1} \qquad W_{te}=M_{w}$$

Writing for the correct number of sectors is controlled by a countdown of the value L in the instruction register by one for each sector time until it is reduced below zero as manifested by the carry $K_s$ remaining true. Record counter 9 of FIGURE 1 is as follows:

$$1^{w}i=R_{1}(M_{1}+K_{s}')+R_{1}'M_{1}'K_{s}$$
$$0^{w}i=R_{1}'(M_{1}+K_{s}')+R_{1}M_{1}'K_{s}$$
$$1^{k}s=M_{1}'t_{0}$$
$$0^{k}s=R_{1}M_{1}'t_{4}$$

where $t_0$ is the bit time just preceding, and $t_4$ is the time during which the value L is read at $R_L$. Termination of the $M_w$ mode and the move or transfer instruction results from, $$0^{m}2=K_{s}M_{1}'t_{L}$$

The countdown logic above applies during the one sector time of $M_1$, as well as $M_w$, since both modes contain $M_1'$. This compensates for the additional sector time necessary to reduce the value L below zero.

Also, it should be clear that for records covering more than one track, switching between heads would occur at the track origin (start of sector zero) without loss of time or data.

Although the invention has been described and illustrated in detail, it is to be understoor that the same is by way of illustration and example only, and is not to be taken by way of limitation; the spirit and scope of this invention being limited only by the terms of the appended claims.

I claim:

1. A variable delay system for transferring data from a first non-random access memory device to a second non-random access memory device comprising.

a third non-random access memory device connected between the first and second devices, means for determining the difference between an address in the first memory device and an address in the seocnd memory device, said third device comprises a plurality of delay means for delaying data received from the first device until it is transferred to the second device, including means responsive to said means for determining the difference for by-passing certain of said delay means for achieving a delay equivalent to the determined difference, means interposed between the first device and the second device and responsive to said means for determining for counting electronic delays to be incurred in transferring data from the first device to the third device and for compensating for said delays.

2. A variable delay system for transferring data from a first non-random access memory device to a second non-random access memory deivce comprising, a third non-random access memory device connected between the first and second devices, means for determining the difference between an address in the first memory device and an address in the second memory device, said third device comprises a plurality of delay means for delaying data received from the first device until it is transferred to the second device, including means responsive to said means for determining the difference for by-passing certain of said delay means for achieving a delay equivalent to the determined difference, said means for determining comprises means for subtracting the addresses and for storing the difference in a binary form comprising logical ones and zeros as the case may be, and means interposed between said first and third devices comprising means for counting adjacent binary ones of said difference and for delaying information from the first device into the third device equivalent to the number of pairs of adjacent ones, each pair of adjacent ones being equivalent to a unit of electronic delay.

3. A variable delay system for transferring data from a first non-random access memory device to a second non-random access memory device comprising, a third non-random access memory device connected between the first and second devices, means for determining the difference between an address in the first memory device and an address in the second memory device.

said third device comprises a plurality of delay means for delaying data received from the first device until it is transferred to the second device, including means responsive to said means for determining the difference for by-passing certain of said delay means for achieving a delay equivalent to the determined difference, shift register means having a plurality of binary bit positions with each position representing one of said plurality of delay means, said third device includes a surface comprising a magnetic material, and a plurality of transducer means for writing information into and reading information from said surface, each of said delay means being separated by a transducer means, said means for determining comprises means for subtracting said addresses and for storing the difference in a binary form or logical ones or zeros, as the case may be, said difference being stored in said shift register means and means responsive to the difference in said register for interconnecting selected ones of said transducers for by-passing the delay means corresponding to the bit position in said register indicating a first logical state.

said means responsive comprises a plurality of logic matrics, with each matrix having a first plurality of inputs from said shift register, and a second plurality of inputs from the plurality of transducer means for reading, including an input from said first device, said plurality of inputs to said matrices decreasing as a function of the increased delay between transducers, each of said matrices having a single output to a selected one of said means for writing, as a function of the logical states of said inputs, said outputs sequentially are connected to the transducer associated with the smallest of said delays and continuing to the transducer associated with the largest delay, including an output connected to the second device.

4. A variable delay system for transferring data from a first non-random access memory device to a second non-random access memory device comprising, a third non-random access memory device connected between the first and second devices, means for determining the difference between an address in the first memory device and an address in the second memory device, said third device comprises a plurality of delay means for delaying data received from the first device until it is transferred to the second device, including means responsive to said means for determining the difference for by-passing certain of said delay means for achieving a delay equivalent to the determined difference, means interposed between said first and seocnd devices comprising means for examining said difference and for delaying information transferred between said first and second devices a period of time equivalent to the electronic delays indicated by said difference.

References Cited

UNITED STATES PATENTS

| | | | |
|---|---|---|---|
| 2,674,732 | 4/1954 | Robbins | 340—347 |
| 2,674,733 | 4/1954 | Robbins | 340—347 |
| 2,907,004 | 9/1959 | Chien et al. | 340—174 |
| 3,302,176 | 1/1967 | McLaughlin | 340—172.5 |

RAULFE B. ZACHE, Primary Examiner